United States Patent [19]

Rosenberg

[11] 3,973,005

[45] Aug. 3, 1976

[54] ANTIBIOTIC TA

[76] Inventor: Eugene Rosenberg, 9 Habrosh St., Ra'anana, Israel

[22] Filed: July 5, 1974

[21] Appl. No.: 485,935

[30] Foreign Application Priority Data

July 10, 1973 Israel.................................. 42701

[52] U.S. Cl................................ 424/115; 195/80 R
[51] Int. Cl.²......................................... A61K 35/74
[58] Field of Search....................... 424/115; 195/80

[56] References Cited
UNITED STATES PATENTS 3,781,420  12/1973  Nishimura et al. ................. 424/118

*Primary Examiner*—Jerome D. Goldberg
*Attorney, Agent, or Firm*—Browdy and Neimark

[57] ABSTRACT

A novel antibiotic, designated as Antibiotic TA, having maximum absorbance at about 242 nm in methanol, an IR spectrum as shown in FIG. 3 and $R_f$ values as given in Table III. A process for obtaining Antibiotic TA by cultivating under aerobic conditions a strain of the species *Myxococcus xanthus* until substantial antibiotic activity is attained, and purifying the antibiotic. Advantageously *Myxococcus xanthus* TA is used. The invention relates also to pharmaceutical and veterinary compositions of matter comprising Antibiotic TA as active ingredient.

4 Claims, 6 Drawing Figures

ANTIBIOTIC TA

BACKGROUND OF THE INVENTION

The Myxococci are Gram-negative nonphotosynthetic procaryotic organisms which are motile on solid surfaces by gliding and which under nutritionally limiting conditions undergo a complex life cycle consisting of aggregation, fruiting body formation and myxospore formation.

The possible role of antibiotics in predation of the Myxobacteria has led to several contradictory reports. It was reported that *Myxococcus virescens* excrete antibiotics into the medium during the end of the exponential growth phase. However, the antibiotic was not purified because of its apparent instability. Other authors were unable to repeat these observations, but were able to demonstrate the *M. virescens* produces an antiotic against *Aerobacter aerogenes*, Kletter and Henis, Can. J. of Microbiol. 9,577, were unable to detect any antibiotic activity against Gram-positive or Gram-negative bacteria in cell-free filtrates of *M. fulvus* and *M. virescens*.

The only clear and direct demonstration of antibiotic production of a Myxobacterium was the discovery by Peterson et al, Can. J. Microbiol. 12; 221, that a certain species of Sorangium produces a wide-spectrum antibiotic, 1-hydroxy-6-methoxyphenazine-5,10 dioxide (Myxin.) Recent reports (1,4,5) indicate that Myxin causes a rapid degradation of DNA in *E. coli*.

BRIEF SUMMARY OF THE INVENTION

According to the present invention there is provided a process for the production of the novel Antibiotic TA which comprises cultivating a suitable microorganism belonging to the species *Myxococcus xanthus* under aerobic conditions on a suitable culture medium until substantial antibiotic activity is attained, and purifying the thus produced antibiotic substance.

A number of strains of the species *Myxococcus xanthus* were tested, and except for degenerative mutants all of these could be utilized for the production of the novel antibitic TA. A strain designated by us as *Myxococcus xanthus* TA was isolated by the inventor from the bark of an olive tree according to the standard procedure of Peterson — Methods in Microbiology, 3B, (1969), Academic Press, N.Y., USA, p. 85–210. A culture of this microorganism has been deposited under No. 31046 to the American Type Culture Collection, Rockville, Md., USA and will be available to the public upon demand.

Another strain, designated as *Myxococcus xanthus* FB was obtained from abroad. This is desposited in the American Type Culture Collection under No. 25232.

*Myxcoccus xanthus* TA and FB can be grown on culture media comprising a mixture of amine acids; they can be grown on certain proteins such as casein. According to the present invention they were grown on a readily available culture medium which is inexpensive, namely on an enzymatic digest of casein, known as Casitone, hereinafter CT. This is a pancreatic digest of casein. Other pancreatic digests of Casein, such as NZ-Case are equally effective. The culture medium used, designated as CT 1% (Casitone — 1% Difco, magnesium sulphate — 0.1% by weight). The cultivation was at a temperature of about 32°C under suitable aeration.

The same antibiotic substance was obtained by cultivating various other strains of *Myxococcus xanthus*, and in the following the invention is illustrated with reference to *Myxococcus xanthus* TA and *Myxococcus xanthus* FB. It ought to be clearly understood that the invention is not to be restricted to these specific strains but that it relates also to other suitable strains of *Myxococcus xanthus* and to mutants thereof which produce during aerobic cultivation the novel Antibiotic TA.

The *Myxococcus xanthus* is cultivated under aerobic conditions such as aeration by constant shaking or by bubbling air through the culture medium in a liquid medium. At a late stage of the exponential growth phase and during the stationary phase of growth the Antibiotic TA is produced. By testing the microorganisms with glycerol myxospore formation is induced. Also the spores produce the same antibiotic. The said microorganisms grow also on solids, and also under these conditions the same antibiotic is produced.

As described in detail hereinafter, the production of the antibiotic levels off after a certain period of time, and at this stage the cultivation is advantageously terminated, the antibiotic is extracted from the aqueous phase by means of a suitable organic solvent and purified. The purified antibiotic TA is obtained as white solid, soluble in chloroform, in methanol, soluble in water to a degree adequate for preparing antibiotically active solutions. The substance is stable under acid, under alkaline conditions, it is quite heat stable and can be purified to a high degree of purity. Purification by a factor of about 1000 was carried out and the Antibiotic TA was characterized by some of its properties, such as IR and UV spectra, chromatographic behaviour in six solvent systems, mass spectra etc.

DESCRIPTION OF THE PREFERRED EMBODIMENT

Cultivation of Myxococcus Xanthus TA

BACTERIA AND GROWTH CONDITIONS

Figure 1:
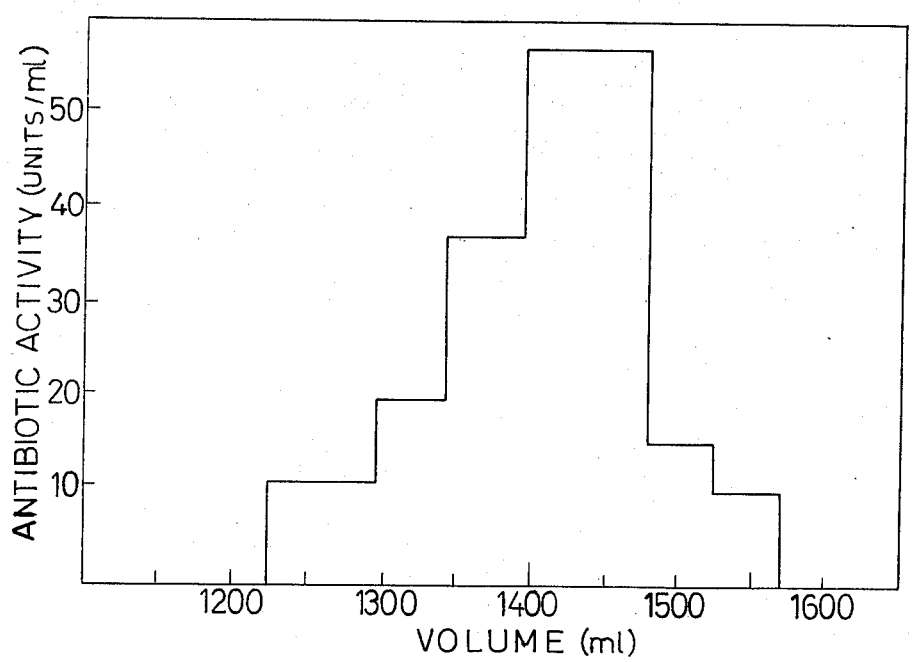
FIG. 1: A profile of the eluation of the silicic acid chromatography step.

*Myxococcus xanthus* TA was isolated in this laboratory from the bark of an olive tree by standard procedures. The organism was stored either as fruiting bodies on dead *E. coli* agar plates or on 0.1% CT agar; 0.1% Casitone (Difco) containing 0.1% $MgSO_4$ and solidified with 1.5% agar (Difco). Unless otherwise specified *M.Xanthus* TA was maintained in liquid culture at 32°C by periodic transfer in 1% CT medium; 1% Casitone (Difco) containing 0.1% $MgSO_4$; aeration was achieved with agitation on a gyratory shaker (300 r.p.m.).

PRODUCTION OF ANTIBIOTIC

Preliminary trials led to the following procedures for antibiotic production: 250 ml flasks, containing 50 ml 0.5% CT media, were innoculated with 1 ml aliquots of an overnight culture of *M. xanthus* TA. The flasks were then incubated at 32°C with vigorous gyratory shaking (300 r.p.m.). Maximum antibiotic production took place in 3-4 days. Since the cells formed a ring which clung to the flask it was usually possible to simply decant the liquid. If necessary, growth media were further clarified by centrifugation at 10,000 × g for 15 min. at 4° C. Antibiotic activity was then extracted from the supernatant with 0.8 volumes of chloroform. The chloroform phase was washed once with distilled water and then concentrated in vacua or with a stream of filtered nitrogen gas. For the paper disc assay method, the chloroform solution of the antibiotic was utilized directly. For certain experiments, the antibiotic was transferred to 0.01 M tris (hydroxymethyl) aminomethane buffer, pH 7.2, by adding the buffer directly to a highly concentrated chloroform solution of the antibiotic and removing the remaining chloroform by bubbling with nitrogen gas. Larger scale production of the antibiotic was performed with 20-liter carbuoys containing 4 liters of growth medium with reciprocal shaking at 32°C.

ANTIBIOTIC ASSAY

Antibiotic acitivity was determined by the paper disc assay method of Loo et al., J. Bacteriol. 50, 701–709, utilizing $E.$ coli B as the test organism. Varying quantities of a chloroform solution of the extracted or purified antibiotic were applied to 5.5. mm diameter discs of Whatman No. 3 mm filter paper and allowed to dry at room temperature for at least 1 hour. The discs were then placed on Nutrient Agar plates which had been overlayed with soft agar containing Nutrient Broth and $10^8$ $E.$ coli B. The diameter of the zone of inhibition was recorded after 18 hours at 37°C. The units of antibiotic activity were determined from a standard curve of zone of inhibition as a function of the quantity of antibiotic applied to the disc. One unit of antibiotic yields a diameter of inhibition of approximately 3 mm (excluding the 5.5 mm disc).

An antibacterial spectrum of the antibiotic was obtained by the paper disc method as described above except substituting the test organism of $E.$ coli B. In each case the soft agar was seeded with $10^6$ test organisms.

CHROMATOGRAPHY

Paper chromatography was performed by the descending technique using Whatman No. 1 paper. The solvent system used was 1-butanol-acetic acid-water (4:1:1; v/v/v). Analytical thin layer chromatography (T.L.C.) was carried out on Aluminium oxide, DC-Karten AL F (Riedel-De Haen). Preparative T.L.C. was carried out on 1.5 mm thick (20 × 20 cm) Aluminum oxide plates, P-254, type T (Merck). The plates were washed with methanol, dried overnight at room temperature, activated at 120°C for 15 min., cooled and used immediately. In 2-dimensional T.L.C. the plates were allowed to dry at room temperature overnight after development with the first solvent. Column chromatography was carried out on Silicic Acid (Kieselsaure)— 100 mesh (Fluka AG, Buchs SG) which had been activated at 120°C for 1 hr, cooled off for 15 min, stirred with chloroform, packed as a slurry and then washed with 2 column volumes of chloroform prior to addition of the antibiotic sample.

ANALYTICAL PROCEDURE

Dry weight determinations were performed by evaporating chloroform solutions of the antibiotic, initially with a stream of filtered nitrogen gas and then in a vacuum desicator at room temperature to constant weight in tared tubes. The ultraviolet spectrum of the purified antibiotic was performed with a Gilford Model 240 spectrophotometer, 1 cc light path, utilizing optical grade methanol (Merck as a solvent). The infrared spectrum was performed with a Perkin-Elmer Model 337 spectrophotometer. Mass spectra was performed with an Hitachi Perkin-Elmer, Model RNV-6E spectrophotometer.

ANTIBIOTIC PRODUCTION

The time course of antibiotic production by $M.xanthus$ TA growing on 0.5% and 2% Casitone is summarized in FIG. 1. Essentially the same amount of antibiotic was extracted from the culture fluid when the cells were grown in 0.2%, 0.5%, 0.75% or 1.0% Casitone medium; above 1% Casitone antibiotic production was inhibited significantly. The increase in pH during growth does not appear to be related to antibiotic production since similar results were obtained in buffered media (final pH 7.4–7.6).

In an attempt to increase the yield of antibiotic a variety of growth parameters were varied, such as temperature (23°–37°C), pH (6.8–8.5), rate of agitation (100–500 r.p.m.) and concentrations of added $K_2HPO_4$ (0–0.1 M), $MgSO_4$ (0.01 – 2 M) and yeast extract (0.0.5%). In no case was antibiotic production improved significantly.

PURIFICATION OF ANTIBIOTIC TA

Prior to purification a preliminary study of the stability of the antibiotic was conducted.

TABLE I

Stability of *Myxococcus xanthus* TA antibiotic

| Treatment[a] | Activity remaining[b](%) |
|---|---|
| pH 1.2, 25°C, 30 min | 95 – 100 |
| pH 3.2, 25°C, 30 min. | 95 – 100 |
| pH 9.8, 25°C, 30 min | 95 – 100 |
| pH 12.5, 25°C, 30 min | 80 – 85 |
| pH 7.4, 100°C, 60 min | 75 – 80 |

[a]pH adjustment was with : HCl (pH 1.2), acetic acid (pH 3.2), NH₄OH (pH 9.8), NaOH (12.4) and tris (hydroxymethyl) amino methane buffer, pH 7.4.
[b]Activity was measured by the paper disc assay method as described in Materials and Methods.

The antibiotic derived from *M. xanthus* TA was sufficiently stable to acid, alkali and heat to proceed with the purification, utilizing standard techniques.

The scheme employed for the extraction and purification of antibiotic TA is illustrated in Scheme 1.

Culture (3–4 days on 0.5% CT medium)
Centrifuge or decant → Discard cells
↓
Supernatant fluid
↓
Extract with 0.8 vol. CHCl₃ → Discard aqueous phase
↓
CHCl₃ phase (Fraction I)
↓
Concentrate by absorbing onto silicic acid and eluting with
↓

↓
5% methanol in CHCl₃; evaporate to dryness and dissolve in
↓
CHCl₃ (Fraction II)
↓
Silicic acid column chromatography; develop with
↓
5% methanol in CHCl₃
↓
Active fractions (FIG. 3) dried and dissolved in CHCl₃ (Fraction III)
↓
Streak onto preparative T.L.C.; develop with 5% methanol in CHCl₃
↓
Elute active zone; dry and dissolve in CHCl₃ (Fraction IV)
↓
Apply spot for 2-dimensional T.L.C.; (1) 10% methanol in CHCl₃; (2) ethyl acetate; isopropanol: H₂O
↓
Elute active spot; dry and dissolve in CHCl₃ (Fraction V)

TABLE II

Purification of *Myxococcus xanthus* TA antibiotic[a]

| Fraction[b] | Volume ml. | Dry weight mg/ml | Dry weight total mg | Antibiotic Activity units/ml | Antibiotic Activity total units | Specific activity units/mg | Recovery % |
|---|---|---|---|---|---|---|---|
| I. CHCl₃ phase | 27,150 | .067 | 1819 | 0.5 | 13,600 | 7.0 | 100 |
| II. Concentrate | 85 | 19.1 | 1630 | 120 | 10,200 | 6.2 | 75 |
| III. Silicic acid chromatography | 5.0 | 67.5 | 337 | 2000 | 10,000 | 30.0 | 74 |
| IV. T.L.C. | 26.0 | — | 3.3 | 317 | 8,200 | 2,500 | 60 |
| V. 2D-T.L.C. | 15.0 | — | 0.39 | 217 | 3,250 | 8,300 | 24 |

[a]Antibiotic purified from 34 liters of culture fluid.
[b]Purification scheme is shown in Table 1.

Extraction of the supernatant fluid resulted in a Quantitative transfer of Antibiotic from the aqueous to chloroform phase (Fraction I). No antibiotic could be extracted from the cells. Silicic acid was employed both for concentrating the antibiotic 40 times (Fraction I) and purifying the activity 4–5 fold (Fraction III). In the concentration step 300 g of silicic acid was required to quantitatively absorb the antibiotic from 27 liters of chloroform; the activity was eluted from the silicic acid batchwise with about 3 liters of 5% methanol in chloroform. The elution profile of the silicic acid chromatography step is shown in FIG. 1. The antibiotic eluted off the column immediately after a contaminating brown band and prior to a yellow pigment.

Preparative thin layer chromatography was performed sequentially by:
1. Applying the concentrated antibiotic as a streak onto the plate and developing with 5% methanol in chloroform ($R_x R_f$ of the active Material was 0.17);
2. Administering Fraction IV was a single spot for two dimensional chromatography; first direction, methanol; chloroform (10.90; v/v) and second direction, ethyl acetate; isopropanol; water (65:23.5:11.5, v/v/v). When the T.L.C. Plates were examined under ultraviolet light following development in the second direction, an isolated U.V. absorbing spot was observed which corresponded precisely to the position of antibiotic activity. The $R_f$s of the antibiotic in the two solvent systems were 0.62 and 0.65, respectively.

The overall purification of the antibiotic from the chloroform extract was over 1000 fold with a recovery of 24%. The final product (Fraction V) had a specific activity of 8.3 units per 1μg. The purification procedure was repeated on a 70 liter scale (initial activity was 1 unit per ml) to yield 3.2 mg of purified antibiotic TA (Recovery — 45%). This purified antibiotic was utilized for further chemical and biological characterization.

PROPERTIES OF ANTIBIOTIC TA

Antibiotic TA migrated as a single ultraviolet absorbing spot on alumina oxide T.L.C. in six solvent systems. See following Table III:

TABLE III

Chromatography of *M. xanthus* TA antibiotic on Alumina oxide[a]

| Solvent system | $R_f$ |
|---|---|
| Methanol: chloroform (5:95, v/v) | 0.17 |
| Methanol : chloroform (10:90, v/v) | 0.62 |
| Methanol: chloroform (15:85, v/v) | 0.83 |
| Acetic acid: methanol: chloroform (1:10:89, v/v/v) | 0.70 |
| Ammonia: methanol: chloroform (1:10:89, v/v/v) | 0.66 |
| Ethyl acetate: isopropanol: water (65:23.5:11.5, v/v/v) | 0.65 |

[a]Analytical thin layer chromatography was performed as described in Materials and Methods.

In each case the ultraviolet absorbing spot corresponded precisely to the region of antibiotic activity. The action spot reacted positively to iodine and Fast Blue B and negatively to Promocresol green, Dichlorofluorescein, Dimethylaminobenzaldehyde, Ninhydrin and Dragendorff reagents. The fact that the mobility of antibiotic TA is similar in neutral, acidic and alkaline solvent systems indicates that the molecule does not contain easily ionizable groups.

Figure 3:
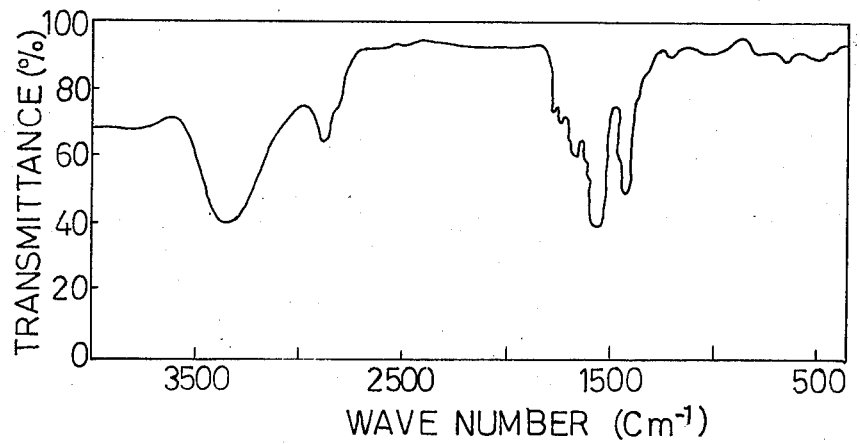
FIG. 3: The I.R. spectrum of Antibiotic TA.

The ultraviolet spectrum of antibiotic TA in methanol yielded a single peak at 242 mm (FIG. 2), extinction coefficient ($E_1$ $_{cm}$$^{1\%}$) equal 108. Assuming a molecular weight of 650 (from mass spectra), the molar extinction coefficient is approximately 7,000. No absorbance was detected in the visable range, even with 0.1% solutions of the purified antibiotic. The infrared spectrum of antibiotic TA is shown in FIG. 3. Mass spectra analysis seem to reveal a molecular ion of 650; characteristic peaks for aromatic compound at $m/e =$ 39, 50, 51, 52 and 65 were not deleted.

ANTIBACTERIAL ACTIVITY

The crude antibiotic (Fraction I) was active against Gram-positive (*Staphylococcus albus* and *Bacillus subtilis*) and Gram-negative (*E. coli* and *Shigella dysenteriae*) bacteria. Since the antibiotic was purified using only *E. coli* B as the test organism, it was of interest to examine whether or not the activities against other bacteria were retained in the purified material (Fraction V). Within experimental error, the crude and purified antibiotic exhibited the same spectrum of activity (Table IV):

TABLE IV

Antibacterial activity[a] of *M. xanthus* TA antibiotic

| Test organism | Chloroform extract[b] 2 units | 10 units | Purified antibiotic[c] 2 units | 10 units |
|---|---|---|---|---|
| Staphylococcus albus | 2.5 | 5.5 | 2 | 3 |
| Bacillus subtilis 168 | 1 | 3 | 0 | 3 |
| E. coli B | 6 | 12 | 6 | 12.5 |
| Shigella dysenteriae | 2.5 | 10.5 | 1 | 10.5 |

Figure 2:
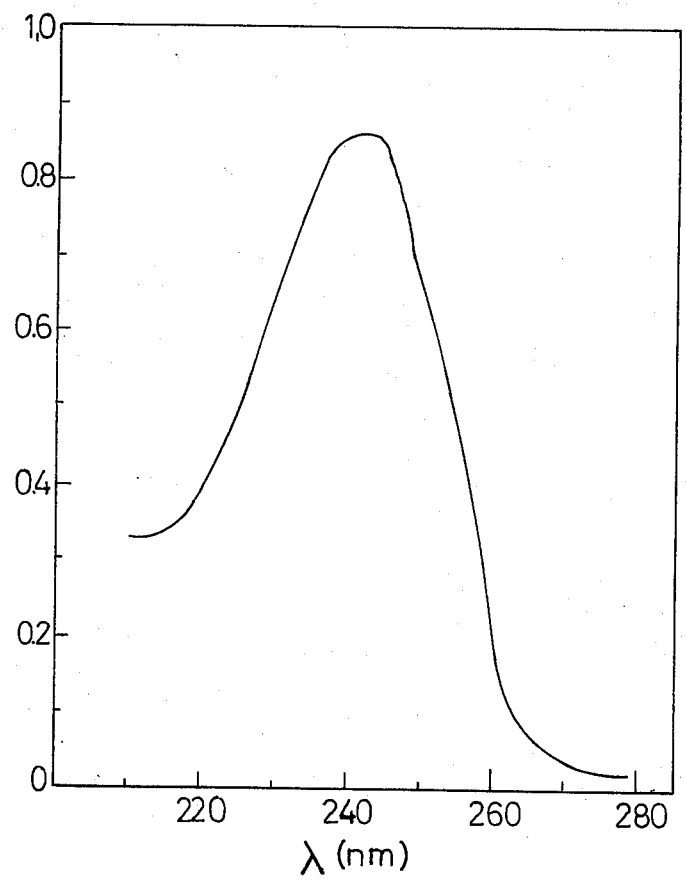
FIG. 2: The U.V. spectrum of Antibiotic TA in methanol.
Figure 4:
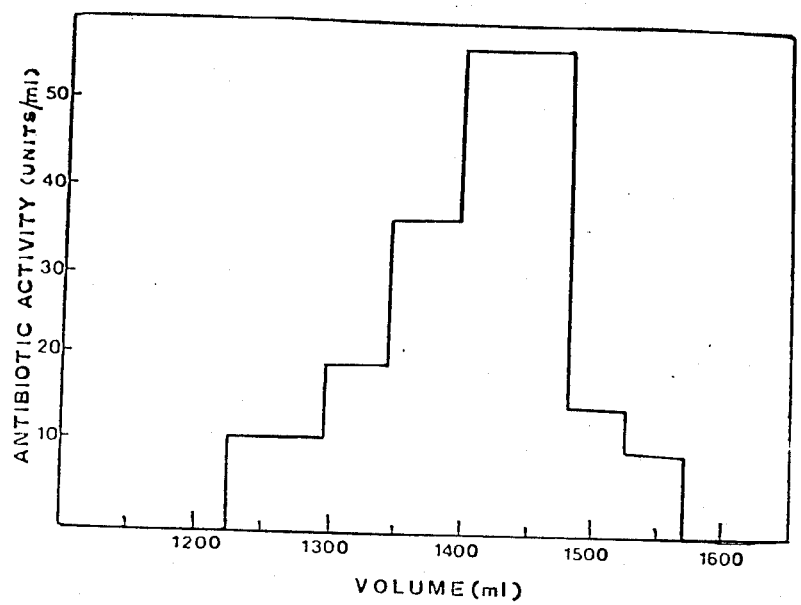
Figure 5:
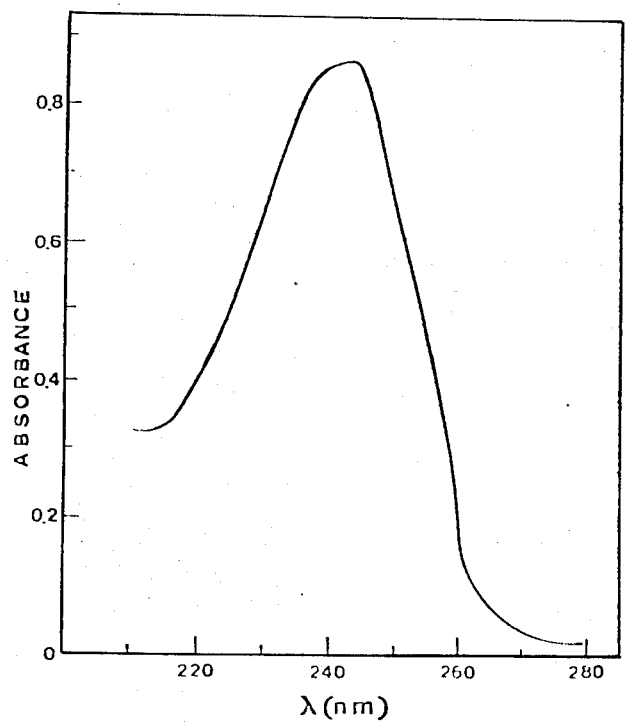
Figure 6:
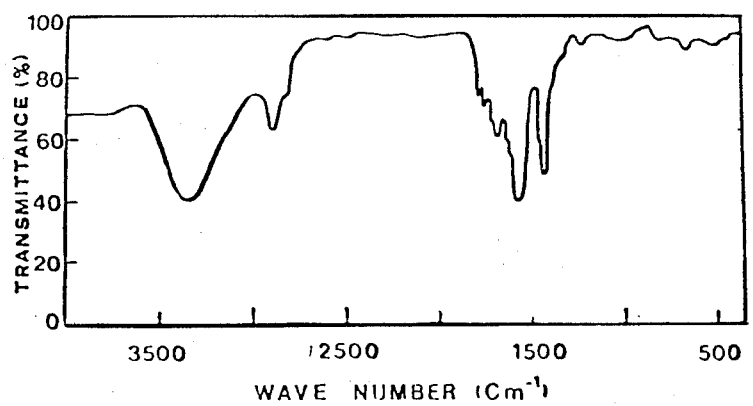

[a]The results are expressed as inhibition zone diameter (mm)
[b]Fraction I (FIG. 2)
[c]Fraction V (FIG. 2)

It should be pointed out that 10 units of the purified antibiotic correspond to only 1 of material.

Antibiotic activity against *E. coli* B was determined either by a dilution series assay procedure or by the paper disc assay method, Loo et al, J.Bac. 50, 701–9. In the dilution series assay procedure, an overnight culture of *E. coli* B in Nutrient Broth was diluted 1:100 into fresh, prewarmed Nutrient Broth and allowed to incubate with aeration at 37°C for 1 hour to this procedure yielded approximately $10^8$ cells per milliliter in exponential growth phase. Varying concentrations of the antibiotic in 0.02 M Tris buffer, pH 7.2 were then added to the exponentially growing culture and incubation continued. After two hours exposure to the antibiotic, viable cell number was determined by spreading appropriate dilutions on Nutrient Agar. One unit of the antibiotic is defined as that quantity which brings about a hundred-fold reduction in the viable cell number in 1 milliliter by this standard assay procedure.

In the paper disc method, varying quantities of a chloroform solution of the antibiotic were applied to 5.5 mm diameter discs of Whatman No. 1.3 mm filter paper and allowed to dry at room temperature for at least one hour. The discs were then placed on Nutrient Agar plates which had been overlayed with soft agar containing Nutrient Broth and $10^8$ *E. coli* B. The diameter of the zone of inhibition was recorded after 18 hours at 37°C. The units of antibiotic activity were determined from a standard inhibition curve. One unit of the antibiotic yields a diameter of inhibition of approximately 3 mm (excluding the 5.5 mm disc).

An antibacterial spectrum of the antibiotic was obtained utilizing the paper disc method as described above, except that various test organisms were substituted for *E. coli* B. In each case the soft agar was seeded with $10^6$ test organisms. Penicillin G (10 units) discs were employed as comparative controls.

ANTIBACTERIAL SPECTRUM

*M. xanthus* T antibiotic is active against several Gram-positive and Gram-negative bacteria (Table V).

TABLE V

Activity of *M. xanthus* antibiotic against bacteria[a]

| Test organism | TA antibiotic[b] 2 units | 10 units | 100 units | Penicillin 10 units |
|---|---|---|---|---|
| Gram-negative bacteria | | | | |
| E. coli B | 6,6[c] | 12,13[c] | — | 12 |
| E. coli K 12 | 4 | 7,4[c] | 15 | 2 |
| E. coli CW 3747 | 3 | 5 | 10 | 5 |
| E. coli (drug resistant) | 0 | 2 | 9 | 0 |
| E. coli 428 (LAC) | 1 | 2 | — | 0 |
| Klebsiella pneumoniae | 9,8[c] | 17,15[c] | — | 0 |
| Proteus morgani | 0 | 0 | 7.5 | 8 |
| Pseudomonas fluorescens | 0 | 0 | 0 | — |
| Salmonella typhimurium | 0 | 0 | 2.5 | 21 |
| Serratia marcescens | 0 | 0 | — | 0 |
| Shigella dysenteriae | 3,1[c] | 11,11[c] | — | 12 |
| Shigella flexneri 2a | 3 | 8 | 16 | 3 |
| Vibria cholerae | 0 | 0 | 0 | 14 |
| Gram-positive bacteria | | | | |
| Bacillus pumilus | 3 | 5 | — | 26 |
| Bacillus subtilis 168 | 1,0[c] | 3,3[c] | — | 26 |
| Bacillus subtilis W 23 | 2,5[c] | 4,8[c] | 8 | 26 |
| Corynebacteria diptheriae | 0,5[c] | 7,11[c] | — | 34 |
| Corynebacteria xerosis | 0 | 2,1[c] | 9 | 22 |
| Staphylococcus albus | 0 | 2,3[c] | 5 | 24 |
| Staphylococcus aureus | 0,0[c] | 3,2[c] | 8 | 42 |
| Streptococcus faecalis | 0 | 1 | 3 | 44 |

[a]The results are expressed as inhibition zone diameter, mm.
[b]Chloroform extracted antibiotic which has been absorbed and eluted off silicic acid was used unless stated otherwise. The unit of activity is defined above.
[c]Purified antibiotic: 10 units = 1.2

The purified antibiotic and the crude chloroform extracted antibiotic exhibited the same spectrum of activity. All of the bacteria tested except for *Pseudomonas fluorescens*, *Vibrio chaerae* and *Seratis marcecens* were sensitive to antibiotic TA. It is interesting to note that an *E. coli* carrying the drug resistance marker was sensitive to antibiotic TA. The sensitivity of *E. coli* B to antibiotic TA was identical on Nutrient Agar, Minimal media and Blood Agar plates. Two fungi, *Sacharomyces cerevisiae* and *Schizophyllum commune*, were not inhibited by 10 units of antibiotic TA.

I claim:

1. A process for producing antibiotic TA, comprising:

cultivating under aerobic conditions *Myxococcus xanthus* TA ATCC 31046 or *Myxococcus xanthus* FB ATCC 25232 in a suitable culture medium until substantial antibiotic activity is obtained, and recovering the antibiotic from said medium.

2. A process in accordance with claim 1, wherein said recovering step comprises extracting the antibiotic with chloroform.

3. A process in accordance with claim 1, wherein the microorganism is cultivated in a culture medium of an enzymatic digest of casein wherein the content of said enzymatic digest of casein is about 1 percent by weight.

4. Antibiotic TA produced by the process of claim 1, and having the following characteristics:

a maximum absorbance in methanol at 242 nm, solubility in chloroform and methanol, $R_f$ values as set forth in Table III, a molecular weight of 650, a U.V.-spectrum in methanol as shown in FIG. 2, and an I.R. spectrum as shown in FIG. 3.

* * * * *